(12) United States Patent
Palmer

(10) Patent No.: US 11,775,389 B2
(45) Date of Patent: *Oct. 3, 2023

(54) DEFERRED ERROR-CORRECTION PARITY CALCULATIONS

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,742

(22) Filed: Mar. 9, 2022

(65) Prior Publication Data

US 2022/0197744 A1 Jun. 23, 2022

Related U.S. Application Data

(63) Continuation of application No. 17/100,622, filed on Nov. 20, 2020, now Pat. No. 11,294,767, which is a continuation of application No. 16/555,132, filed on Aug. 29, 2019, now Pat. No. 10,866,861.

(51) Int. Cl.
*G06F 11/00* (2006.01)
*G06F 11/10* (2006.01)
*G06F 3/06* (2006.01)

(52) U.S. Cl.
CPC ........ *G06F 11/1076* (2013.01); *G06F 3/0604* (2013.01); *G06F 3/064* (2013.01); *G06F 3/0659* (2013.01); *G06F 3/0673* (2013.01)

(58) Field of Classification Search
CPC .... G06F 11/1076; G06F 3/0604; G06F 3/064; G06F 3/0659; G06F 3/0673
See application file for complete search history.

(56) References Cited

U.S. PATENT DOCUMENTS

| | | | |
|---|---|---|---|
| 5,278,838 A | 1/1994 | Ng et al. | |
| 7,562,285 B2 | 7/2009 | Wang et al. | |
| 10,838,811 B1* | 11/2020 | Kuo | G06F 11/1068 |
| 10,866,861 B1 | 12/2020 | Palmer | |
| 2008/0126909 A1 | 5/2008 | Talbot | |
| 2008/0168304 A1 | 7/2008 | Flynn et al. | |
| 2011/0225475 A1 | 9/2011 | Kumar et al. | |
| 2018/0189133 A1 | 7/2018 | Prathapan et al. | |
| 2018/0336092 A1* | 11/2018 | Kim | G06F 11/1048 |
| 2019/0243578 A1 | 8/2019 | Thompson et al. | |
| 2021/0034267 A1* | 2/2021 | Kucherov | G06F 11/1088 |
| 2021/0103497 A1 | 4/2021 | Palmer | |

* cited by examiner

*Primary Examiner* — Christine T. Tu

(74) *Attorney, Agent, or Firm* — Schwegman Lundberg & Woessner, P.A.

(57) ABSTRACT

Aspects of the present disclosure configure a system component, such as memory sub-system controller, to defer performance of an error-correction parity calculation for a block of a memory components of the memory subsystem. In particular, a memory sub-system controller of some embodiments can defer (e.g., delay) performance of an error-correction parity calculation and can defer the error-correction parity calculation such that it is performed at a time when the memory sub-system satisfies an idle state condition.

20 Claims, 8 Drawing Sheets

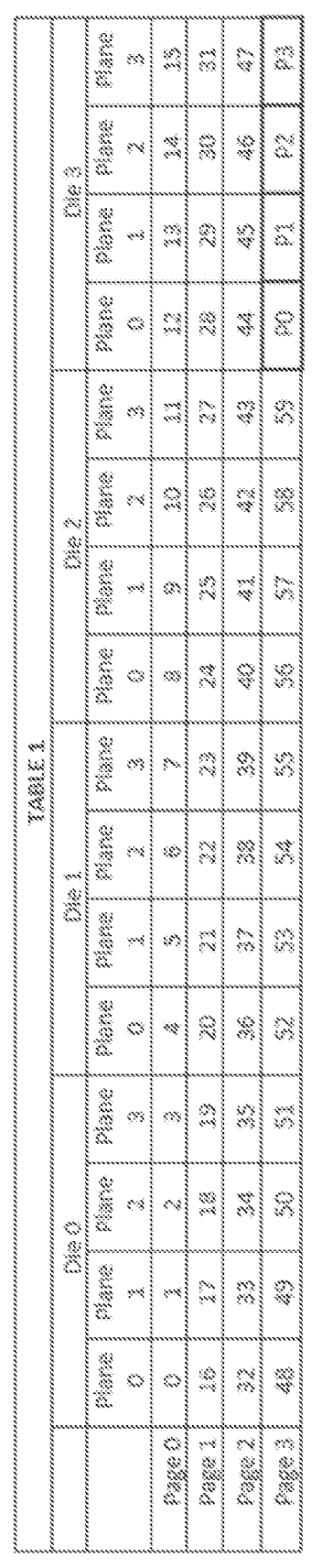

TABLE 1

|  | Die 0 | | | | Die 1 | | | | Die 2 | | | | Die 3 | | | |
|---|---|---|---|---|---|---|---|---|---|---|---|---|---|---|---|---|
|  | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| Page 0 | 0 | 1 | 2 | 3 | 4 | 5 | 6 | 7 | 8 | 9 | 10 | 11 | 12 | 13 | 14 | 15 |
| Page 1 | 16 | 17 | 18 | 19 | 20 | 21 | 22 | 23 | 24 | 25 | 26 | 27 | 28 | 29 | 30 | 31 |
| Page 2 | 32 | 33 | 34 | 35 | 36 | 37 | 38 | 39 | 40 | 41 | 42 | 43 | 44 | 45 | 46 | 47 |
| Page 3 | 48 | 49 | 50 | 51 | 52 | 53 | 54 | 55 | 56 | 57 | 58 | 59 | P0 | P1 | P2 | P3 |

*FIG. 5*

DEFERRED ERROR-CORRECTION PARITY CALCULATIONS

PRIORITY APPLICATION

This application is a continuation of U.S. application Ser. No. 17/100,622, filed Nov. 20, 2020, which is a continuation of U.S. application Ser. No. 16/555,132, filed Aug. 29, 2019, now issued as U.S. Pat. No. 10,866,861, all of which are incorporated herein by reference in their entirety.

TECHNICAL FIELD

Embodiments of the disclosure relate generally to memory sub-systems and more specifically, to error-correction parity calculations in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 5 presents a table illustrating an example error-correction protection using dedicated blocks of a set of memory components to store the error-correction parity data, in accordance with some implementations of the present disclosure.

DETAILED DESCRIPTION

Figure 1:
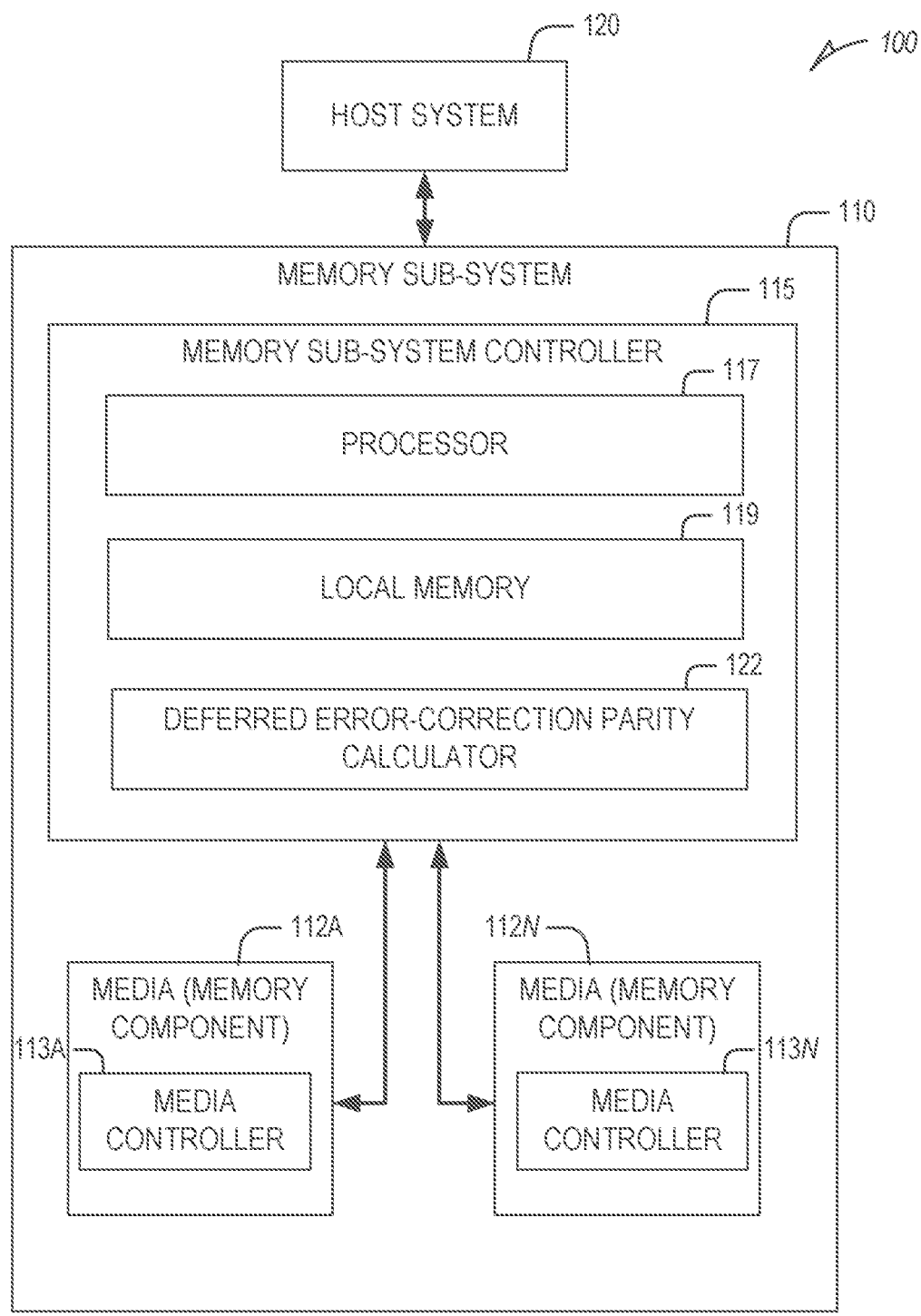
FIG. 1 is a block diagram illustrating an example computing environment including a memory sub-system, in accordance with some embodiments of the present disclosure.

Aspects of the present disclosure are directed to deferring (e.g., delaying) error-correction parity calculations in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests to the memory sub-system, such as to store data at the memory sub-system and to read data from the memory sub-system. The data specified by the host is hereinafter referred to as "host data". The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data".

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more dice. Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Conventional memory sub-systems can employ error-correction techniques, such using a redundant array of independent NAND-type flash memory devices (hereafter, referred to as a RAIN technique), to protect data (e.g., host or user data) stored on the memory sub-systems. Error-correction techniques can comprise calculating parity (e.g., XOR parity) across some collection of data (e.g., host/user data) being error-protected. By such error-correction techniques, if a data member of the collection is lost (e.g., corrupted) for any reason, the parity calculation can be reperformed and the lost data recreated. As error-correction techniques, such as RAIN techniques, get more complex, so can the number of parallel parity calculations performed to achieve the error-correction protection and the memory resources needed to perform the parallel parity calculations. For example, when the set of memory components comprise multi-plane NAND devices, such as triple-level cell (TLC) NAND devices, multiple (e.g., dozens of) parity calculations may need to be performed in parallel to implement data protection (e.g., for host/user data) stored on the memory sub-system.

Unfortunately, memory resources for performing parallel calculations on a memory sub-system (e.g., operative memory space of a controller of a memory sub-system) can become prohibitively expensive. For instance, with 16 KB memory pages, 32 calculations can require 512 KB of static random access memory (SRAM) of a controller of the memory sub-system for each write cursor. To address this issue, some RAIN techniques use temporary memory (e.g., one or more single-level cell (SLC) NAND devices) to hold temporary parity calculations (e.g., partial parity calculations) and swap out such temporary parity calculations as needed to reduce usage of operative memory (e.g., SRAM). However, the swapping of a RAIN technique can involve significant overhead and performance penalties, which can have large negative impacts to performance of the memory sub-system. Additionally, some RAIN techniques write error-correction parity calculation results in-line with the host/user data on the memory sub-system, which can degrade sequential read performance of the memory sub-system.

Aspects of the present disclosure address the above and other deficiencies by configuring a system component, such as a memory sub-system controller of a memory sub-system, to defer performance of an error-correction parity calculation for a block of a memory components of the memory subsystem. In particular, a memory sub-system controller of some embodiments described herein can defer (e.g., delay) performance of a parity calculation for an error-correction technique (referred to herein as an error-correction parity calculation) and can defer the error-correction parity calculation such that it is performed at a time when the memory sub-system satisfies an idle state condition, also referred to herein as idle time. For instance, some embodiments cause a memory sub-system to delay performance of an error-correction parity calculation and storage of a result of the error-correction parity calculation to when the memory sub-system satisfies an idle state condition (e.g., idle time for the memory sub-system). For some embodiments, the memory sub-system comprises a set of NAND memory components, and the error-correction parity calculation can be associated with a RAIN technique used (by the memory sub-system) to achieve error-correction protection of data (e.g., host/user data) stored on the set of NAND memory components.

By deferring (e.g., delaying) performance of an error-correction parity calculation and storage of its result as described herein, various embodiments can reduce or remove at least some performance penalties associated with performing parallel parity calculations associated with an error-correction technique (e.g., RAIN technique), and at least some memory resource usage (e.g., SRAM usage) associated with performing parallel parity calculations. Various embodiments described herein would be configured (e.g., via a data count threshold value and a time period for checking an idle state condition) to leave data unprotected for only a small window of time after deferring (e.g., delaying) performance of an error-correction parity calculation. The approach presented by various embodiments described herein can decouple the storage of the error-correction parity data and the host/user data, and can further reduce or remove performance penalties associated with sequential read where the error-correction parity data is stored in-line with the host/user data. Various embodiments described herein can reduce or remove work associated with swapping intermediate/partial parity calculations (e.g., associated with a RAIN technique) with respect to blocks (e.g., high-endurance swap blocks) of a NAND device, and in doing so, can enable a memory sub-system to reallocate those blocks for other purposes, can increase endurance of the NAND device, and can improve net energy use of the memory sub-system (e.g., because many intermediate/partial parity swap operations are no longer performed and the sequential read performance penalties for in-line storage of parity data).

According to some embodiments, a memory sub-system defers (e.g., delays) one or more error-correction parity calculations (e.g., of a RAIN technique) until the memory sub-system satisfies an idle state condition. As used herein, a time when a memory sub-system satisfies an idle state condition can be referred to as an idle time for the memory sub-system. Examples of idle state conditions can include, without limitation, when no commands from a host system remain in a command queue of the memory sub-system, such as when the host system is in an idle state. Where the host system comprises a mobile device, the idle state can comprise, for example, a time when the mobile device is sleeping (e.g., overnight), a time when the display of the mobile device is off and the mobile device is charging, or some other time when the mobile device is idle.

For some embodiments, a memory sub-system (e.g., memory sub-system controller) receives host or user data from a host system and writes the host/user data to a set of blocks (e.g., open blocks) on a set of memory components of the memory sub-system. As the host/user data is written to the set of blocks, the memory sub-system can do so while deferring a set of error-correction protection operations for the set of blocks to a time when the memory sub-system satisfies an idle state condition. Additionally, the memory sub-system can increment a count of data that is awaiting the error-correction protection operations. For some embodiments, the set of error-correction protection operations comprises performing a set of error-correction parity calculations and writing (e.g., storing) results thereof on the memory sub-system. Depending on the embodiment, the results of the set of error-correction parity calculations can be written in-line with the host/user data on the set of memory components, or can be written to dedicated (e.g., reserved) memory of the memory sub-system, such as dedicated parity blocks of the set of memory components that are separate from blocks used to store data (e.g., host/user data) being protected.

For some embodiments, the memory sub-system (e.g., memory sub-system controller) then waits for a time when the memory sub-system satisfies an idle state condition and, if it arrives, the memory sub-system can begin the error-correction protection operations (e.g., set of error-correction parity calculations). This can be regarded as implementing background (or deferred) error-correction protection operations. If the error-correction protection operations complete prior to the memory sub-system leaving the idle state condition, the set of results generated by the error-correction protection operations can be written on the memory sub-system. Until the error-correction protection operations are performed and the results written on the memory sub-system, the host/user data can be considered temporarily unprotected by the error-correction technique. Performing the error-correction parity calculations can comprise reading memory pages from the set of blocks that is awaiting such calculations, and then writing the set of results of the error-correction parity calculations on the memory sub-system, such as to dedicated memory (e.g., dedicated parity block of the set of memory components) of the memory sub-system. Upon writing the set of error-correction parity calculation results on the memory sub-system, the memory sub-system can decrement the count of data that is awaiting the error-correction protection operations accordingly.

For some embodiments, if the memory sub-system determines that an idle state condition has not been satisfied by the memory sub-system in a period of time, and the count surpasses a threshold value (e.g., the count value is sufficiently large), the memory sub-system can perform the error-correction protection operations (e.g., set of error-correction parity calculations) previously deferred and awaiting performance. This can be regarded as implementing foreground error-correction protection operations, which can be used by some embodiments to ensure error-correction protection operations are performed for data awaiting such operations when idle times are not sufficient for starting or completing the error-correction protection operations (e.g., idle times do not arrive often enough to perform the operations, or do not last long enough for the operations to complete). The set of error-correction protection operations (e.g., 128 read commands to produce a single page of error-protection parity data) can be intermixed with operations being performed with respect to user/host (e.g., being performed in response to one or more commands from a host system). The operations being performed with respect to user/host can comprise read command traffic that may be slower than the read commands involved with the error-correction protection operations.

As noted herein, for some embodiments, the set of memory components (of the memory sub-system) comprises a set of dedicated blocks for storing error-correction parity calculation data (e.g., results) that error-correction protects data (e.g., host/user data) stored on the set of memory components, where the set of dedicated blocks is separate from the set of blocks on the memory components that store the protected data. In this way, some embodiments can reduce or avoid the performance penalty that sequential reads experienced when the error-correction parity calculation data is stored in-line with the data that it is protecting (no need to skip the error-correction parity calculation data during a sequential read since it is stored in the dedicated blocks separate from the blocks storing the protected data).

For some embodiments, a technique described herein for deferred error-correction parity calculation is used with a temporary physical memory page (e.g., on single-level cell (SLC) cache) for short term error-correction protection. Additionally, for some embodiments, a technique described herein for deferred error-correction parity calculation comprises performing garbage collection cleanup periodically (e.g., once per day) to ensure data (e.g., user data) is error-correction protected.

For some embodiments described herein, the set of memory components comprises a plurality of NAND devices for storing user data, and the memory sub-system controller implements a redundant array of independent NAND devices (RAIN) technique with respect to the plurality of NAND devices, which can provide error-correction protection for host/user data stored on the plurality of NAND devices. For example, the RAIN protection scheme used can comprise a parity scheme having a stripe length (e.g., 7 data bits) that describes how many host/user data elements (e.g., host/user data bits) form a single stripe of host/user data (stored on the plurality of NAND devices) that is associated and protected by a single parity element (e.g., single parity bit). A given single parity element associated with and protecting a given stripe of host/user data can be calculated using an XOR parity calculation. Where the plurality of NAND devices comprises multi-plane NAND devices, such as TLC NAND devices, each plane can participate in a separate XOR parity calculation, thereby providing multi-plane failure detection and enabling the memory sub-system controller to independently rebuild each plane using parity data.

Though various embodiments are described herein as being implemented with respect to a memory sub-system (e.g., a controller of the memory sub-system), some or all of portions of an embodiment can be implemented with respect to a host system, such as a software application or an operating system of the host system.

Disclosed herein are some examples of memory sub-systems that perform operations relating to performing deferred error-correction parity calculations.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a deferred error-correction parity calculator 122 that performs or facilitates deferred error-correction parity calculation in accordance with some embodiments described herein. In some embodiments, the controller 115 includes at least a portion of the deferred error-correction parity calculator 122. For example, the controller 115 can include a processor 117 (processing device) configured to execute instructions stored in local memory 119 for performing the operations described herein. In some embodiments, the deferred error-correction parity calculator 122 is part of the host system 120, such as a software application or an operating system on the host system 120.

According to some embodiments, the memory sub-system 110 can receive, from the host system 120, a request to write data (e.g., host/user data) to the memory components 112A to 112N. In response to the request, the deferred error-correction parity calculator 122 can cause the memory sub-system controller 115 to write the data to a set of blocks of the memory components 112A to 112N while deferring performance of a set of error-correction parity calculations on the set of blocks being written to. Additionally, in response to the request, the deferred error-correction parity calculator 122 can cause the memory sub-system controller 115 to update tracking data to indicate that the set of blocks is awaiting performance of the set of error-correction parity calculations. For instance, where the tracking data comprises a counter of blocks awaiting performance of at least one error-correction parity calculation, the counter can be incremented by the number of blocks awaiting performance of the at least one error-correction parity calculation. Depending on the embodiment, the tracking data can be saved in reserved memory space of the memory sub-system 110, which can be provided by the memory components 112A to 112N or the local memory 119. The tracking data can comprise a data structure that can implement one or more counters that indicate how much data (e.g., how many blocks) are awaiting performance of a set of error-correction parity calculations. For some embodiments, the tracking data identifies which blocks are awaiting performance of an error-correction parity calculation.

The deferred error-correction parity calculator 122 can cause the memory sub-system controller 115 to determine (e.g., periodically determine or monitor) whether the memory sub-system satisfies an idle state condition. In this way, the memory sub-system 110 can wait for idle time for the memory sub-system 110. As noted herein, an example idle state condition can comprise a command queue (not shown) of the memory sub-system 110 satisfying an empty condition, such as the command queue not containing any commands based on a request (e.g., request to write user data) from the host system 120.

The deferred error-correction parity calculator 122 can cause the memory sub-system controller 115 to perform the set of error-correction parity calculations on the set of blocks based on at least one of the tracking data or the determining whether the memory sub-system 110 satisfies the idle state condition. For example, in response to determining that the memory sub-system has started to satisfy the idle state condition, the deferred error-correction parity calculator 122 can cause the memory sub-system controller 115 to initiate performance of the set of error-correction parity calculations on one or more blocks of the set of blocks.

Subsequently, prior to the memory sub-system 110 leaving the idle state condition, the deferred error-correction parity calculator 122 can cause the memory sub-system controller 115 to determine whether the performance of set of error-correction parity calculations has concluded. In response to determining that the performance of set of error-correction parity calculations has concluded prior to the memory sub-system 110 leaving the idle state condition, the deferred error-correction parity calculator 122 can cause the memory sub-system controller 115 to write a set of error-correction parity calculation results, from the (completed) set of error-correction parity calculations, to the memory components 112A to 112N.

Additionally, in response to determining that the performance of set of error-correction parity calculations has concluded prior to the memory sub-system 110 leaving the idle state condition, the deferred error-correction parity calculator 122 can cause the memory sub-system controller 115 to update the tracking data to indicate that the one or more blocks of the set of blocks are no longer awaiting performance of the set of error-correction parity calculations. For instance, where the tracking data comprises a counter of blocks awaiting performance of at least one error-correction parity calculation, the counter can be decremented by the number of blocks that are no longer awaiting performance of at least one error-correction parity calculation. As noted herein, for some embodiments, the set of error-correction parity calculation results is written to a set of dedicated blocks of the memory components 112A to 112N. Alternatively, in response to determining that the memory sub-system has left the idle state condition prior to the performance of the set of error-correction parity calculations concluding, the deferred error-correction parity calculator 122 can cause the memory sub-system controller 115 to cease (e.g., abort) the performance of the set of error-correction parity calculations. In doing so, the deferred error-correction parity calculator 122 can cause the memory sub-system controller 115 to discard any intermediate/partial error-correction parity data generated thus far, thereby freeing up any memory resources (e.g., on the local memory 119) that was being used by the performance of the set of error-correction parity calculations.

For some embodiments, while the memory sub-system 110 does not satisfy the idle state condition, the deferred error-correction parity calculator 122 can cause the memory sub-system controller 115 to perform the set of error-correction parity calculations on the set of blocks by determining (e.g., periodically determining), based on the tracking data, whether a count of blocks awaiting performance of at least one error-correction parity calculation surpasses a threshold count value. The determination of whether the count of blocks has surpassed the threshold count value can be performed, for example, according to a time interval (e.g., periodically) or each time the tracking data is updated. The threshold count value can be determined/defined, for example, at the time of manufacture of the memory sub-system or by a user of the memory sub-system 110 (e.g., via the host system 120). In response to determining that the count of blocks has surpassed the threshold count value, the deferred error-correction parity calculator 122 can cause the memory sub-system controller 115 to initiate performance of one or more error-correction parity calculations from the set of error-correction parity calculations on one or more blocks, which can be identified by the tracking data. In this way, various embodiments can use the count of blocks and the threshold count value to limit how many blocks can remain unprotected by error-correction between idle times of the memory sub-system; where the number of blocks awaiting at least one error-correction parity calculation gets high enough (i.e., surpasses the threshold count value), performance of the set of error-correction parity calculations can be performed in the foreground.

Depending on the embodiment, the deferred error-correction parity calculator 122 can comprise logic (e.g., a set of machine instructions, such as firmware) or one or more components that causes the memory sub-system 110 (e.g., the memory sub-system controller 115) to perform operations described herein with respect to the deferred error-correction parity calculator 122. The deferred error-correction parity calculator 122 can comprise a tangible unit capable of performing operations described herein. Further details with regards to the operations of the deferred error-correction parity calculator 122 are described below.

Figure 2:
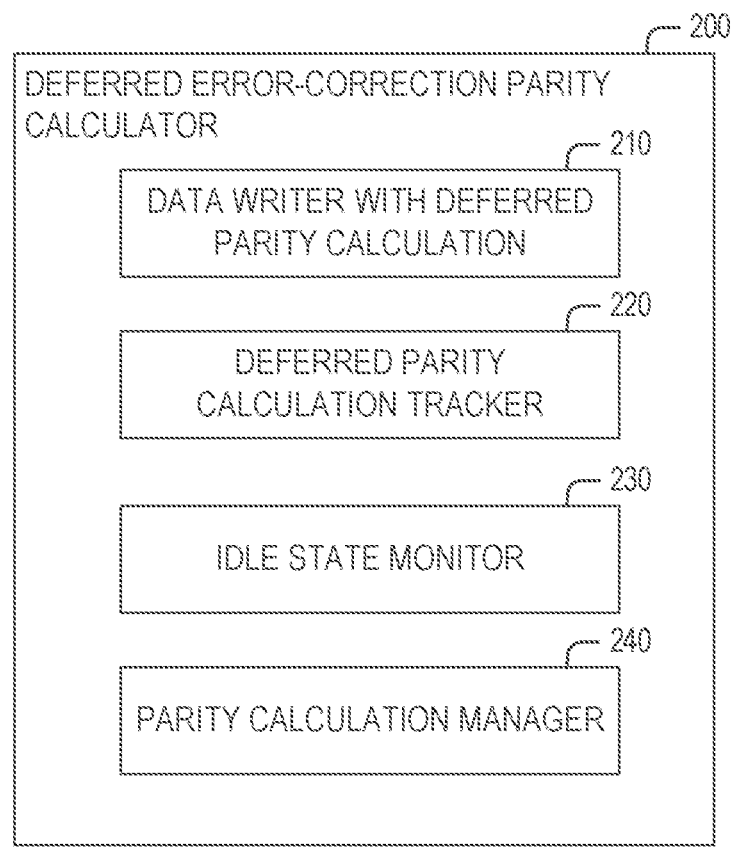
FIG. 2 is a block diagram of an example deferred error-correction parity calculator, in accordance with some implementations of the present disclosure.

FIG. 2 is a block diagram of an example deferred error-correction parity calculator 200, in accordance with some implementations of the present disclosure. As illustrated, the deferred error-correction parity calculator 200 comprises a data writer with deferred parity calculation 210, a deferred parity calculation tracker 220, an idle state monitor 230, and a parity calculation manager 240. For some embodiments, the deferred error-correction parity calculator 200 can differ in components or arrangement (e.g., less or more components) from than what is illustrated in FIG. 2.

The data writer with deferred parity calculation 210 enables or facilitates writing user data to a set of blocks of the set of memory components 112 while deferring performance of a set of error-correction parity calculations on the set of blocks. The deferred parity calculation tracker 220 enables or facilitates updates to tracking data to indicate whether a set of blocks is awaiting performance of at least one error-correction parity calculation. For instance, the deferred parity calculation tracker 220 can enable or facilitate incrementing or decrementing a count of blocks awaiting at least one error correction parity calculation. The idle state monitor 230 enables or facilitates determining (e.g., periodically determining or monitoring) whether a memory sub-system 110 satisfies an idle state condition. The parity calculation manager 240 enables or facilitates management of performance of a set of error-correction parity calculations. Management by the parity calculation manager 240 can include, without limitation: initiating performance of an error-correction parity calculation; ceasing performance of an error-correction parity calculation currently being performed (e.g., in response to the memory sub-system 110 leaving an idle state condition); clearing out memory of intermediate/partial error-correction parity calculation results generated by an error-correction parity calculation that has been ceased; or writing a set of results from an error-correction parity calculation (e.g., to a dedicated parity block of a memory component 112) when the error-correction parity calculation has completed performance.

Figure 3:
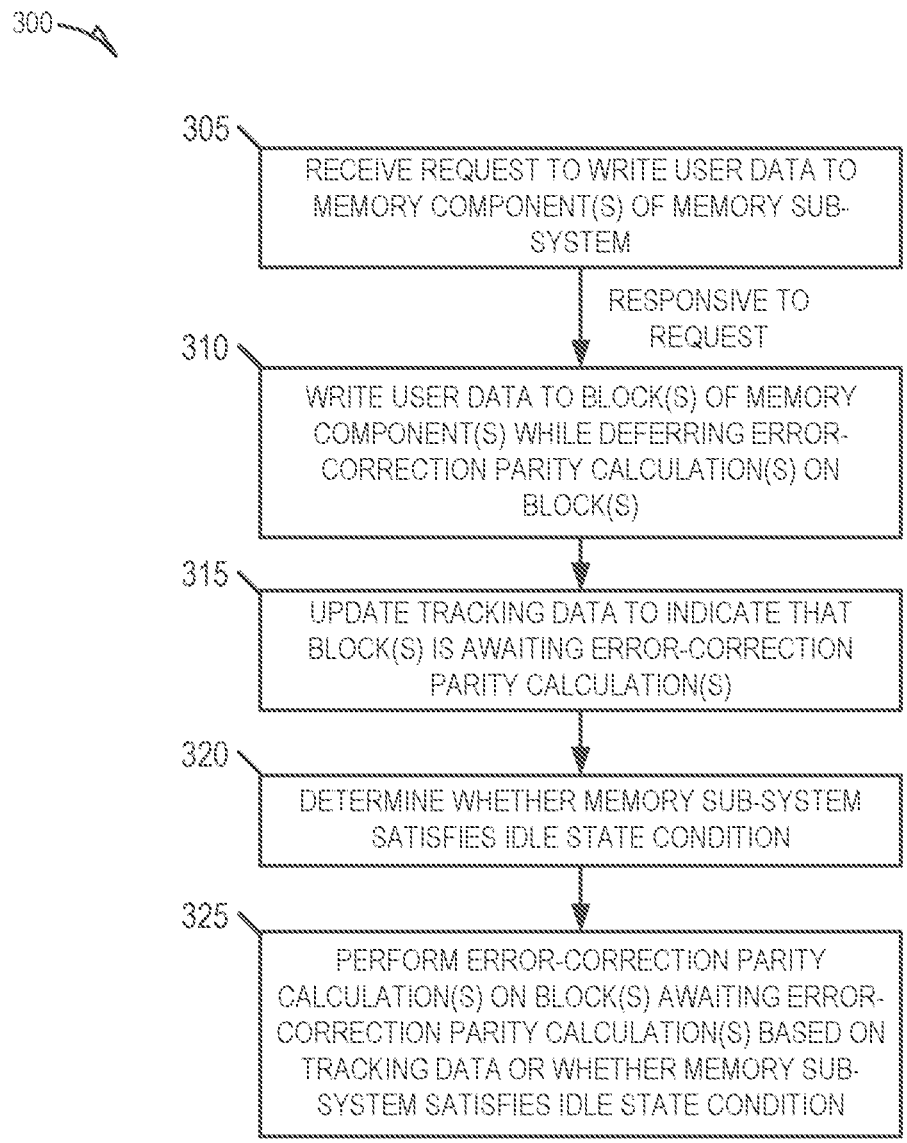
FIGS. 3 and 4 are flow diagrams of example methods to defer error-correction parity calculations, in accordance with some implementations of the present disclosure.
Figure 4:
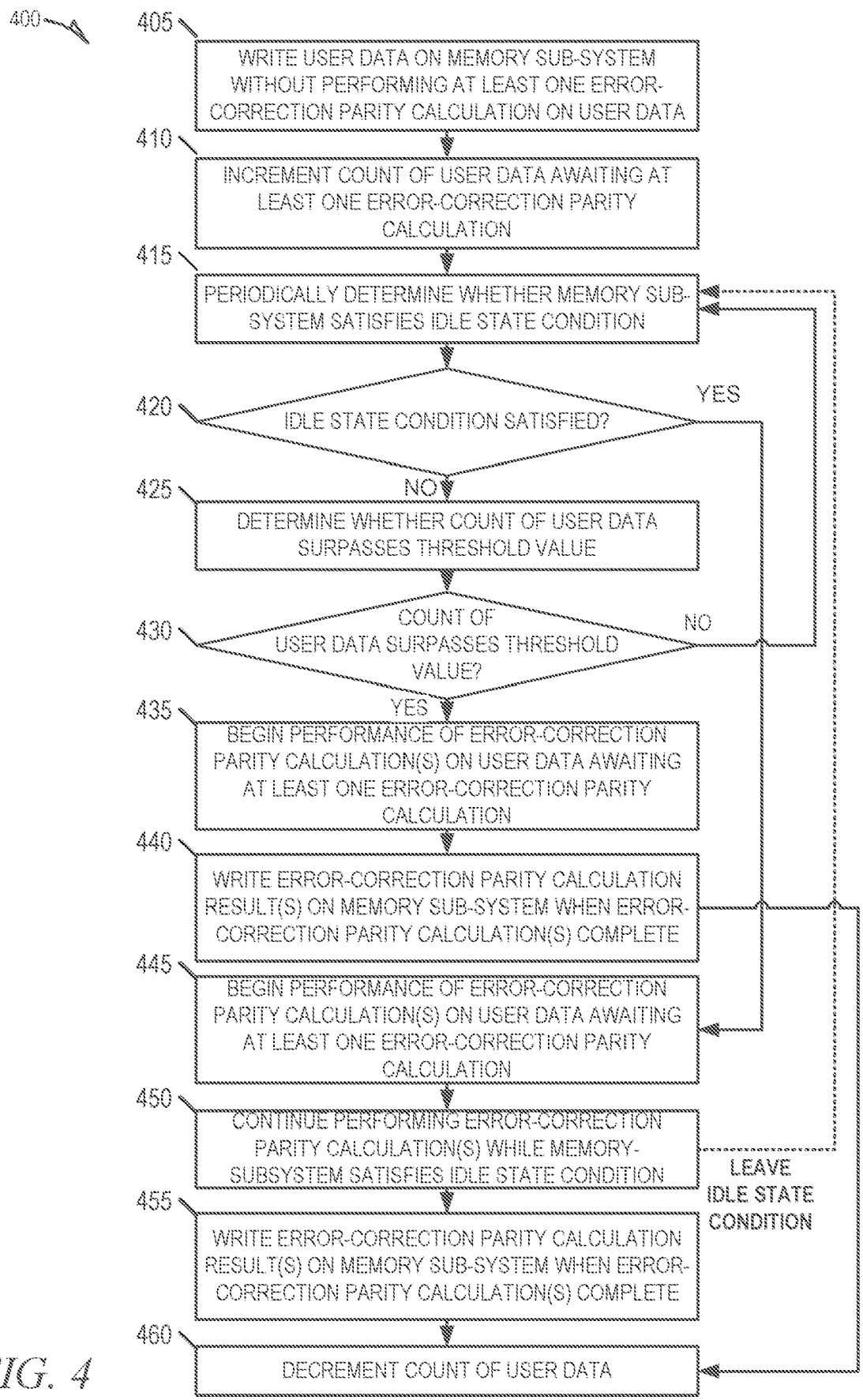

FIGS. 3 and 4 are flow diagrams of example methods 300, 400 to defer error-correction parity calculations, in accordance with some implementations of the present disclosure. Either of the methods 300, 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the memory sub-system controller 115 of FIG. 1. In these embodiments, the method 300 or the method 400 can be performed, at least in part, by the deferred error-correction parity calculator 122. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method 300 begins at operation 305, with a processing device of a memory sub-system (e.g., of processor of the memory sub-system controller 115) receiving a request to write data (hereafter, referred to as user data) a set of memory components (e.g., the memory components 112A to 112N) of the memory sub-system. For some embodiments, the request is from a host system (e.g., the host system 120) communicatively coupled to the memory sub-system.

At operation 310, the processing device of the memory sub-system in response to receiving the request at operation 305, the processing device of the memory sub-system writes user data to a set of blocks of the set of memory components while deferring performance of a set of error-correction parity calculations on the set of blocks. For some embodiments, a set of results from performing the set of error-correction parity calculations on the set of blocks facilitates error-correction protection of the set of blocks. For instance, the set of memory components can comprise a set of NAND devices, and the error-protection technique (facilitated by the set of error-correction parity calculations) comprises a RAIN technique as described herein.

Thereafter, at operation 315, the processing device of the memory sub-system updates tracking data to indicate that the set of blocks is awaiting at least one error-correction parity calculation. For instance, where the tracking data comprises a counter of blocks awaiting performance of at least one error-correction parity calculation, the counter can be incremented by the number of blocks awaiting performance of the at least one error-correction parity calculation. Eventually, when one or more error-correction parity calculations are performed, completed, and written to the set of memory components (e.g., to dedicated blocks), the counter can be decremented accordingly. Depending on the embodiment, the tracking data can be saved in reserved memory space of the memory sub-system, which can be provided by the set of memory components (e.g., 112A to 112N) or local memory (e.g., 119) of a controller of the memory sub-system (e.g., 115). As noted herein, the tracking data can comprise a data structure that can implement one or more counters that indicate how much data (e.g., how many blocks) are awaiting performance of a set of error-correction parity calculations. For some embodiments, the tracking data identifies which blocks are awaiting performance of an error-correction parity calculation.

At operation 320, the processing device of the memory sub-system determines (e.g., periodically determines or monitors) whether the memory sub-system satisfies an idle state condition. An example idle state condition can comprise a command queue of the memory sub-system satisfying an empty condition, such as the command queue not containing any commands based on a request from the host system (e.g., 120).

The processing device of the memory sub-system at operation 325, performs the set of error-correction parity calculations on the set of blocks based on at least one of the tracking data (updated at operation 315) or the determining whether the memory sub-system satisfies the idle state condition (at operation 320). For some embodiments, operation 325 comprises initiating performance of the set of error-correction parity calculations on one or more blocks of the set of blocks in response to determining that the memory sub-system has started to satisfy the idle state condition at operation 320. Once the memory sub-system starts to satisfy idle state condition, prior to the memory sub-system leaving the idle state condition, the memory sub-system controller can determine whether the performance of set of error-correction parity calculations has concluded. In response to determining that the performance of set of error-correction parity calculations has concluded prior to the memory sub-system leaving the idle state condition, the memory sub-system controller can: write a set of error-correction parity calculation results, from the (completed) set of error-correction parity calculations, to the set of memory components; and updating the tracking data (e.g., decrementing the counter of blocks) to indicate that the one or more blocks of the set of blocks are no longer awaiting performance of the set of error-correction parity calculations. As noted herein, the set of error-correction parity calculation results can be written to a set of dedicated blocks of the set of memory components.

In response to determining that the memory sub-system has left the idle state condition prior to the performance of the set of error-correction parity calculations concluding, the memory sub-system controller can cease (e.g., abort) the performance of the set of error-correction parity calculations (initiated earlier). Where the performance of the set of error-correction parity calculations is ceased, the memory sub-system can discard any intermediate/partial error-correction parity data generated thus far, thereby freeing up any memory resources (e.g., on the local memory 119) that was being used by the performance of the set of error-correction parity calculations.

While the memory sub-system does not satisfy the idle state condition (does not do so for while), the memory sub-system can perform the set of error-correction parity calculations on the set of blocks by determining (e.g., periodically determining), based on the tracking data, whether a count of blocks awaiting performance of at least one error-correction parity calculation surpasses a threshold count value. The determination of whether the count of blocks has surpassed the threshold count value can be performed, for example, according to a time interval (e.g., periodically) or each time the tracking data is updated.

Referring now FIG. 4, the method 400 begins at operation 405, with a processing device of a memory sub-system writing user data on a memory sub-system (e.g., the memory components 112A to 112N of the memory sub-system 110) without performing at least one error-correction parity calculation (e.g., associated with error-correction protection provided by a RAIN technique) on the user data written. As noted herein, operation 405 can be performed in response to a request received from a host system (e.g., 120). According to some embodiments, since the user data is being written without performing one or more error-correction parity calculations associated on the user data written, the user data is at least temporarily not error-correction protected.

The method 400 continues to operation 410, where the processing device of the memory sub-system increments a count of user data (e.g., count of blocks storing user data) awaiting at least one error-correction parity calculation (in association with error-correction protecting the user data). Thereafter, at operation 415, the method 400 continues with the processing device of the memory sub-system periodically determining (e.g., based on a time interval) whether the memory sub-system satisfies an idle state condition. In this way, the memory sub-system can wait for idle time for the memory sub-system before initiating performance of one or more error-correction parity calculations with respect to the user data awaiting such calculations.

Thereafter, at operation 420, the method 400 continues to operation 445 in response to the processing device of the memory sub-system determining that the memory sub-system satisfies an idle state condition, otherwise the method 400 continues to operation 425. Reaching operation 445 can be an indication that the memory sub-system has started to satisfy the idle state condition.

At operation 425, the processing device of the memory sub-system determines whether the count of user data (awaiting at least one error-correction parity calculation) surpasses a threshold value. As noted herein, the threshold value can be one defined by a manufacturer or a user of the memory sub-system (e.g., via settings issued by a host system). The method 400 continues with operation 430, where, in response to the processing device of the memory sub-system determining that the count of host data surpasses a threshold value, the method 400 continues to operation 435, otherwise the method 400 returns to operation 415. Returning to operation 415 can be an indication that the memory sub-system is continues to wait for the idle state condition to be satisfied by the memory sub-system (e.g., continuing to wait for idle time for the memory sub-system).

Subsequently, at operation 435, the processing device of the memory sub-system begins performance of a set of error-correction parity calculations on the user data written on the memory sub-system (e.g., by operation 405) processing device of the memory sub-system. The method 400 continues to operation 440, where the processing device of the memory sub-system writes a set of error-correction parity calculations results (resulting from the set of error-correction parity calculations of operation 435) on the memory sub-system (e.g., dedicated blocks of the memory components 112A to 112N of the memory sub-system 110) when the set of error-correction parity calculations of operation 435 complete. Subsequently, the method 400 continues to operation 460, where the processing device of the memory sub-system decrements the count of user data (processing device of the memory sub-system) based on the number of blocks for which the set of error-correction parity calculation results is written at operation 440. Operations 435 and 440 can represent foreground performance of one or more error-correction parity calculations by an embodiment.

Referring now to operation 445, the processing device of the memory sub-system begins performance of a set of error-correction parity calculations on the user data written on the memory sub-system (e.g., by operation 405) processing device of the memory sub-system. The method 400 continues to operation 450, where the processing device of the memory sub-system continues to perform error-correction parity calculations while the memory sub-system satisfies (continues to satisfy) the idle state condition. If the memory sub-system ceases to satisfy the idle state condition (e.g., leaves the idle state condition, such as the command queue of the memory sub-system receiving a command from the host system 120), the method 400 can return to operation 415 and, additionally, the memory sub-system can discard any intermediate/partial error-correction parity calculation results that have been generated thus far by performance of the set of error-correction parity calculations. Where the set of error-correction parity calculations complete prior to the memory sub-system leaving the idle state condition, the method 400 continues to operation 455, where the processing device of the memory sub-system writes a set of error-correction parity calculations results (resulting the set of error-correction parity calculations of operation 445) on the memory sub-system (e.g., dedicated blocks of the memory components 112A to 112N of the memory sub-system 110).

Subsequently, the method 400 continues to operation 460, where the processing device of the memory sub-system decrements the count of user data (processing device of the memory sub-system) based on the number of blocks for which the set of error-correction parity calculation results is written at operation 455. Operations 445 through 455 can be represent background (or deferred) performance of one or more error-correction parity calculations by an embodiment.

FIG. 5 presents a Table 1 that illustrates an example of an error-correction protection technique (more specifically, a RAIN technique) that uses dedicated data parity blocks of a set of memory components, in accordance with some embodiments, to store the error-correction parity data (e.g., results). As shown by Table 1, the example RAIN technique is implemented by four NAND die (Die 0 through 3), where each die has four planes (Plane 0 through 3). For some embodiments, the die are implemented using SLC NAND devices with multiplane support. The data chunk size for each memory page 0 through 3 on each plane can comprise 16 KB. Each of P0, P1, P2, and P3 (on Die 3) represents dedicated memory parity blocks, which can be used to store the result of an error-correction parity calculation performed on data chunks stored in a plurality of memory pages. For instance, P0 can comprise error-correction parity data for (e.g., results from one or more error-correction parity calculations performed on) pages 0, 4, 8, 12, . . . , 56; P1 can comprise error-correction parity data for pages 1, 5, 9, 13, . . . , 57; P2 can comprise error-correction parity data for pages 2, 6, 10, 14, . . . , 58; and P3 can comprise error-correction parity data for pages 3, 7, 11, 15, . . . , 59.

Figure 6A:
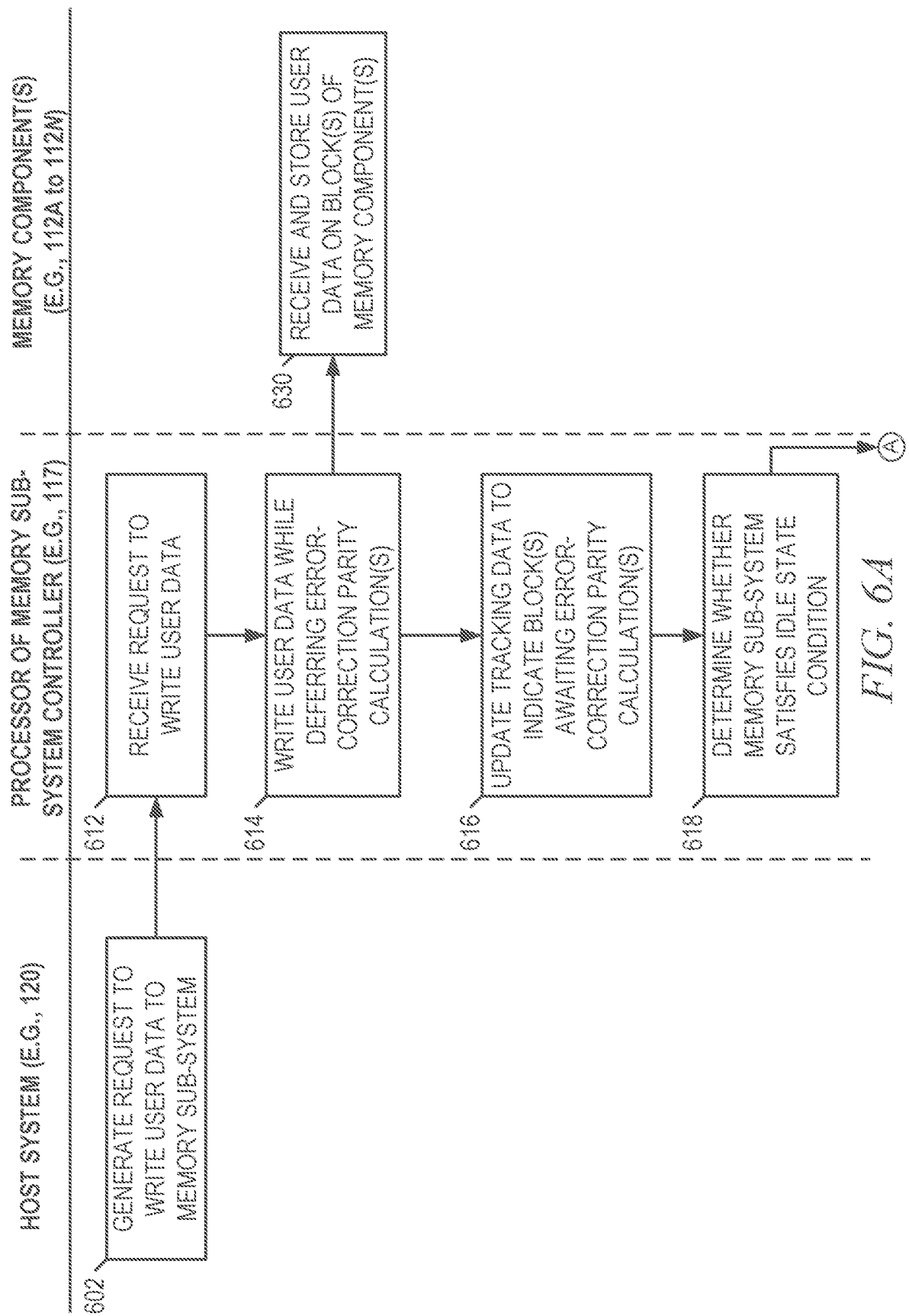
FIGS. 6A and 6B provide an interaction diagram illustrating interactions between components of the computing environment in the context of some embodiments in which a method to perform deferred error-correction parity calculation.
Figure 6B:
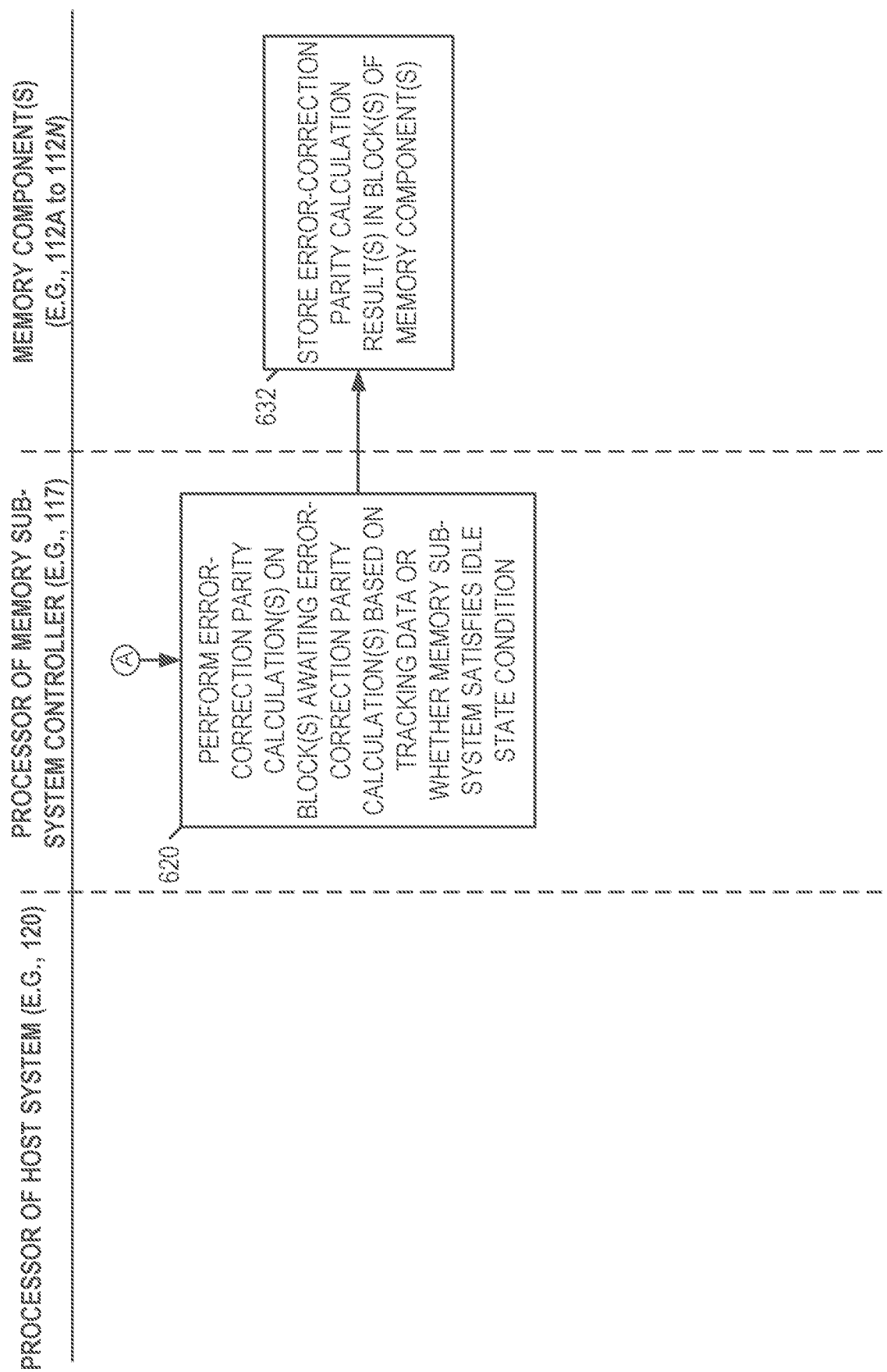

FIGS. 6A and 6B provide an interaction diagram illustrating interactions between components of the computing environment 100 in the context of some embodiments in which a method to perform deferred error-correction parity calculation. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 6A and 6B, the host system can comprise the host system 120, the processor of the memory sub-system controller can comprise the processor 117 of the memory sub-system 110, and the one or more memory components can comprise at least one of the memory components 112A to 112N.

As shown in FIG. 6A, at operation 602, the host system (e.g., via a processor of the host system 120) generates a request to write user data to the memory sub-system and, at operation 612, the processor of the memory sub-system controller receives the request from the host system.

At operation 614, the processor of the memory sub-system controller writes user data to a set of blocks (e.g., open blocks) of a set of memory components (e.g., the memory components 112A to 112N) while deferring performance of one or more error-correction parity calculations on the blocks to which the user data is being written. At operation 630, the set of memory components receive and store the user data in a set of blocks of the set of memory components.

At operation 616, the processor of the memory sub-system controller updates tracking data to indicates that the set of blocks (to which the user data is written by operation 614) is awaiting at least one error-correction parity calculation. At operation 616, the processor of the memory sub-system controller determines (e.g., periodically determines or monitors) whether the memory sub-system satisfies an idle state condition, such as a command queue of the memory sub-system being empty of any commands received from the host.

Referring now to FIG. 6B, at operation 620 the processor of the memory sub-system controller performs a set of error-correction parity calculation on the set of blocks (awaiting performance of such calculations) based on at least one of the tracking data (updated at operation 616) or a determination of whether the memory sub-system satisfies an idle state condition.

Figure 7:
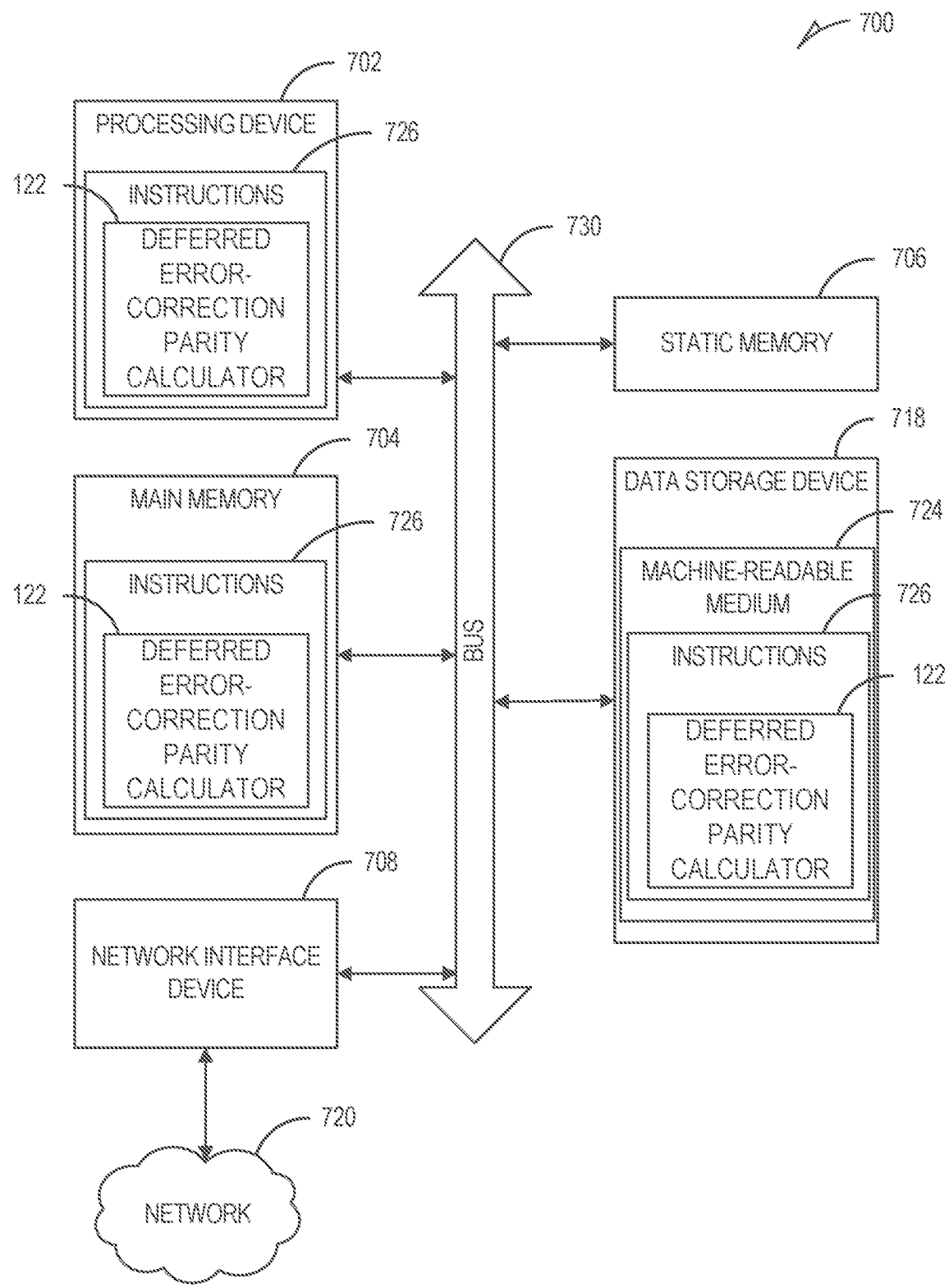
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the deferred error-correction parity calculator 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a deferred error-correction parity calculator (e.g., the deferred error-correction parity calculator 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

EXAMPLES

Example 1 is a method comprising: receiving, from a host system, a request to write user data to a set of memory components of a memory sub-system; in response to the request: writing the user data to a set of blocks of the set of memory components while deferring performance of a set of error-correction parity calculations on the set of blocks; and updating tracking data to indicate that the set of blocks is awaiting performance of at least one error-correction parity calculation; determining whether the memory sub-system satisfies an idle state condition; and performing, based on at least one of the tracking data or the determining whether the memory sub-system satisfies the idle state condition, the set of error-correction parity calculations on the set of blocks.

In Example 2, the subject matter of Example 1 optionally includes where the performing, based on the at least one of the tracking data or the determining whether the memory sub-system satisfies the idle state condition, the set of error-correction parity calculations on the set of blocks comprises: in response to determining that the memory sub-system has started to satisfy the idle state condition, initiating performance of the set of error-correction parity calculations on one or more blocks of the set of blocks.

In Example 3, the subject matter of Example 1 or Example 2 optionally includes where the performing, based on the at least one of the tracking data or the determining whether the memory sub-system satisfies the idle state condition, the set of error-correction parity calculations on the set of blocks further comprises: prior to the memory sub-system leaving the idle state condition: determining whether the performance of set of error-correction parity calculations has concluded; in response to determining that the performance of the set of error-correction parity calculations has concluded, writing a set of error-correction parity calculation results from the set of error-correction parity calculations to the set of memory components.

In Example 4, the subject matter of any one of Examples 1 to 3 optionally includes where the performing, based on the at least one of the tracking data or the determining whether the memory sub-system satisfies the idle state condition, the set of error-correction parity calculations on the set of blocks further comprises: prior to the memory sub-system leaving the idle state condition: in response to determining that the performance of the set of error-correction parity calculations has concluded, updating the tracking data to indicate that the one or more blocks of the set of blocks are no longer awaiting performance of at least one error-correction parity calculation.

In Example 5, the subject matter of any one of Examples 1 to 4 optionally includes where the performing, based on the at least one of the tracking data or the determining whether the memory sub-system satisfies the idle state condition, the set of error-correction parity calculations on the set of blocks further comprises: in response to determining that the memory sub-system has left the idle state condition prior to the performance of the set of error-correction parity calculations concluding, ceasing the performance of the set of error-correction parity calculations.

In Example 6, the subject matter of any one of Examples 1 to 5 optionally includes where the memory sub-system comprises a command queue for queuing commands to be performed by the memory sub-system, and the idle state condition comprises the command queue satisfying an empty condition.

In Example 7, the subject matter of any one of Examples 1 to 6 optionally includes where the performing, based on the at least one of the tracking data or the determining whether the memory sub-system satisfies the idle state condition, the set of error-correction parity calculations on the set of blocks comprises: while the memory sub-system does not satisfy the idle state condition: determining, based on the tracking data, whether a count of blocks awaiting performance of at least one error-correction parity calculation surpassed a threshold count value; and in response to determining that the count of blocks has surpassed the threshold count value, initiating performance of one or more error-correction parity calculations from the set of error-correction parity calculations on one or more blocks identified by the tracking data.

In Example 8, the subject matter of any one of Examples 1 to 7 optionally includes where the tracking data comprises a counter of blocks awaiting performance of at least one error-correction parity calculation.

In Example 9, the subject matter of any one of Examples 1 to 8 optionally includes where the performance of the set of error-correction parity calculations comprises parallel performance of one or more error-correction parity calculations from the set of error-correction parity calculations.

Example 10 is a system comprising: a set of memory components; and a processing device, operatively coupled to the set of memory components, configured to perform operations comprising: receiving, at the system, a request to write user data to the set of memory components; in response to receiving the request: writing the user data to a set of blocks of the set of memory components while deferring performance of a set of error-correction parity calculations on the set of blocks; and updating a counter that counts blocks awaiting performance of at least one error-correction parity calculation; determining whether the system satisfies an idle state condition; and performing, based on at least one of the counter or the determining whether the system satisfies the idle state condition, the set of error-correction parity calculations on the set of blocks.

In Example 11, the subject matter of Example 10 optionally includes where the performing, based on the at least one of the counter or the determining whether the system satisfies the idle state condition, the set of error-correction parity calculations on the set of blocks comprises: in response to determining that the system has started to satisfy the idle state condition, initiating performance of the set of error-correction parity calculations on one or more blocks of the set of blocks.

In Example 12, the subject matter of any one of Example 10 or Example 11 optionally includes where the performing, based on the at least one of the counter or the determining whether the system satisfies the idle state condition, the set of error-correction parity calculations on the set of blocks further comprises: prior to the system leaving the idle state condition: determining whether the performance of set of error-correction parity calculations has concluded; in response to determining that the performance of the set of error-correction parity calculations has concluded, writing a set of error-correction parity calculation results from the set of error-correction parity calculations to the set of memory components.

In Example 13, the subject matter of any one of Examples 10 to 12 optionally includes where the performing, based on the at least one of the counter or the determining whether the system satisfies the idle state condition, the set of error-correction parity calculations on the set of blocks further comprises: prior to the system leaving the idle state condition: in response to determining that the performance of the set of error-correction parity calculations has concluded, updating the counter to indicate that the one or more blocks of the set of blocks are no longer awaiting performance at least one error-correction parity calculation.

In Example 14, the subject matter of any one of Examples 10 to 13 optionally includes where the performing, based on the at least one of the counter or the determining whether the system satisfies the idle state condition, the set of error-correction parity calculations on the set of blocks further comprises: in response to determining that the system has left the idle state condition prior to the performance of the set of error-correction parity calculations concluding, ceasing the performance of the set of error-correction parity calculations.

In Example 15, the subject matter of any one of Examples 10 to 14 optionally includes a command queue for queuing commands to be performed by the system, and the idle state condition comprises the command queue satisfying an empty condition.

In Example 16, the subject matter of any one of Examples 10 to 15 optionally includes where the performing, based on the at least one of the counter or the determining whether the system satisfies the idle state condition, the set of error-correction parity calculations on the set of blocks comprises: while the system does not satisfy the idle state condition: determining whether the counter has surpassed a threshold count value; and in response to determining that the counter has surpassed the threshold count value, initiating performance of the one or more error-correction parity calculations on one or more blocks of the set of blocks.

In Example 17, the subject matter of any one of Examples 10 to 16 optionally includes where the performance of the set of error-correction parity calculations comprises parallel performance of one or more error-correction parity calculations from the set of error-correction parity calculations.

Example 18 is non-transitory computer-readable storage medium comprising instructions that, when executed by a processing device, cause the processing device to perform operations comprising: writing user data, from a host system, to a set of blocks of a set of memory components of a memory sub-system while deferring performance of a set of error-correction parity calculations on the set of blocks; updating tracking data to indicate that the set of blocks is awaiting performance of at least one error-correction parity calculation; determining whether the memory sub-system satisfies an idle state condition; and in response to determining that the memory sub-system has started to satisfy the idle state condition, initiating performance of the set of error-correction parity calculations on one or more blocks of the set of blocks.

In Example 19, the subject matter of Example 18 optionally includes where the operations further comprise: prior to the memory sub-system leaving the idle state condition: determining whether the performance of set of error-correction parity calculations has concluded; in response to determining that the performance of the set of error-correction parity calculations has concluded, writing a set of error-correction parity calculation results from the set of error-correction parity calculations to the set of memory components.

In Example 20, the subject matter of any one of Example 18 or Example 19 optionally includes where the operations further comprise: prior to the memory sub-system leaving the idle state condition: in response to determining that the performance of the set of error-correction parity calculations has concluded, updating the tracking data to indicate that the one or more blocks of the set of blocks are no longer awaiting performance of at least one error-correction parity calculation.

What is claimed is:

1. A method comprising:
   writing user data to a set of blocks of a set of memory components, of a memory sub-system, while deferring performance of a set of error-correction parity calculations on the set of blocks;
   determining that the memory sub-system satisfies an idle state condition; and
   in response to determining that the memory sub-system has at least started to satisfy the idle state condition, initiating performance of the set of error-correction parity calculations on one or more blocks of the set of blocks.

2. The method of claim 1, wherein the performance of the set of error-correction parity calculations on the one or more blocks comprises:
   performing the set of error-correction parity calculations on the one or more blocks based on tracking data, the tracking data indicating that the one or more blocks are awaiting performance of at least one error correction parity calculation.

3. The method of claim 1, comprising:
   prior to the memory sub-system leaving the idle state condition:
   determining whether the performance of set of error-correction parity calculations on the one or more blocks has concluded; and
   in response to determining that the performance of the set of error-correction parity calculations on the one or more blocks has concluded, writing a set of error-correction parity calculation results from the set of error-correction parity calculations to the set of memory components.

4. The method of claim 1, comprising:
   prior to the memory sub-system leaving the idle state condition:
   in response to determining that the performance of the set of error-correction parity calculations on the one or more blocks has concluded, updating tracking data to indicate that the one or more blocks are no longer awaiting performance of at least one error-correction parity calculation.

5. The method of claim 1, comprising:
   in response to determining that the memory sub-system has left the idle state condition prior to the performance of the set of error-correction parity calculations on the one or more blocks concluding, ceasing the performance of the set of error-correction parity calculations.

6. The method of claim 1, wherein the memory sub-system comprises a command queue for queuing commands to be performed by the memory sub-system, and the idle state condition comprises the command queue satisfying an empty condition.

7. The method of claim 1, comprising, after the performance of the set of error-correction parity calculations on the one or more blocks has concluded:
   determining that the memory sub-system does not satisfy the idle state condition; and
   while the memory sub-system does not satisfy the idle state condition:
   determining, based on tracking data, whether a count of blocks awaiting performance of at least one error-correction parity calculation surpassed a threshold count value, the tracking data indicating which blocks of the set of blocks is awaiting performance of at least one error-correction parity calculation; and
   in response to determining that the count of blocks has surpassed the threshold count value, initiating performance of one or more error-correction parity calculations from the set of error-correction parity calculations on at least one block identified by the tracking data.

8. The method of claim 7, wherein the tracking data comprises a counter of blocks awaiting performance of at least one error-correction parity calculation.

9. The method of claim 1, wherein the performance of the set of error-correction parity calculations on the one or more blocks comprises parallel performance of one or more error-correction parity calculations from the set of error-correction parity calculations on the one or more blocks.

10. A system comprising:
    a set of memory components; and
    a processing device, operatively coupled to the set of memory components, configured to perform operations comprising:
    writing user data to a set of blocks of the set of memory components while deferring performance of a set of error-correction parity calculations on the set of blocks;
    determining whether the system satisfies an idle state condition; and
    in response to determining that the system has at least started to satisfy the idle state condition, initiating performance of the set of error-correction parity calculations on one or more blocks of the set of blocks.

11. The system of claim 10, wherein the performance of the set of error-correction parity calculations on the one or more blocks comprises:
performing the set of error-correction parity calculations on the one or more blocks based on tracking data, the tracking data indicating that the one or more blocks are awaiting performance of at least one error correction parity calculation.

12. The system of claim 10, wherein the operations comprise:
prior to the system leaving the idle state condition:
determining whether the performance of set of error-correction parity calculations on the one or more blocks has concluded; and
in response to determining that the performance of the set of error-correction parity calculations on the one or more blocks has concluded, writing a set of error-correction parity calculation results from the set of error-correction parity calculations to the set of memory components.

13. The system of claim 10, wherein the operations comprise:
prior to the system leaving the idle state condition:
in response to determining that the performance of the set of error-correction parity calculations on the one or more blocks has concluded, updating tracking data to indicate that the one or more blocks are no longer awaiting performance of at least one error-correction parity calculation.

14. The system of claim 10, wherein the operations comprise:
in response to determining that the system has left the idle state condition prior to the performance of the set of error-correction parity calculations on the one or more blocks concluding, ceasing the performance of the set of error-correction parity calculations.

15. The system of claim 10, further comprising a command queue for queuing commands to be performed by the system, and the idle state condition comprises the command queue satisfying an empty condition.

16. The system of claim 10, wherein the operations comprise, after the performance of the set of error-correction parity calculations on the one or more blocks has concluded:
determining whether the system satisfies the idle state condition; and
while the system does not satisfy the idle state condition:
determining, based on tracking data, whether a count of blocks awaiting performance of at least one error-correction parity calculation surpassed a threshold count value, the tracking data indicating which blocks of the set of blocks is awaiting performance of at least one error-correction parity calculation; and
in response to determining that the count of blocks has surpassed the threshold count value, initiating performance of one or more error-correction parity calculations from the set of error-correction parity calculations on at least one block identified by the tracking data.

17. The system of claim 16, wherein the tracking data comprises a counter of blocks awaiting performance of at least one error-correction parity calculation.

18. The system of claim 10, wherein the performance of the set of error-correction parity calculations on the one or more blocks comprises parallel performance of one or more error-correction parity calculations from the set of error-correction parity calculations on the one or more blocks.

19. A non-transitory machine-readable storage medium comprising instructions that, when executed by a processing device, cause the processing device to perform operations comprising:
writing user data, from a host system, to a set of blocks of a set of memory components of a memory sub-system while deferring performance of a set of error-correction parity calculations on the set of blocks;
determining whether the memory sub-system satisfies an idle state condition; and
in response to determining that the memory sub-system has at least started to satisfy the idle state condition, initiating performance of the set of error-correction parity calculations on one or more blocks of the set of blocks.

20. The non-transitory machine-readable storage medium of claim 19, wherein the performance of the set of error-correction parity calculations on the one or more blocks comprises:
performing the set of error-correction parity calculations on the one or more blocks based on tracking data, the tracking data indicating that the one or more blocks are awaiting performance of at least one error correction parity calculation.

* * * * *